United States Patent
Pillai Suseelamma

(10) Patent No.: US 12,430,879 B2
(45) Date of Patent: Sep. 30, 2025

(54) ELECTRONIC IMAGE COMPARISON AND MATERIALITY DETERMINATION

(71) Applicant: HRB Innovations, Inc., Las Vegas, NV (US)

(72) Inventor: Renjith Radhakrishna Pillai Suseelamma, Kollam (IN)

(73) Assignee: HRB Innovations, Inc., Wilmington, DE (US)

( * ) Notice: Subject to any disclaimer, the term of this patent is extended or adjusted under 35 U.S.C. 154(b) by 457 days.

(21) Appl. No.: 17/949,585

(22) Filed: Sep. 21, 2022

(65) Prior Publication Data

US 2024/0104892 A1   Mar. 28, 2024

(51) Int. Cl.
| | | |
|---|---|---|
| *G06V 10/75* | (2022.01) | |
| *G06V 10/44* | (2022.01) | |
| *G06V 10/762* | (2022.01) | |
| *G06V 20/60* | (2022.01) | |
| *H04N 1/40* | (2006.01) | |

(52) U.S. Cl.
CPC .......... *G06V 10/759* (2022.01); *G06V 10/449* (2022.01); *G06V 10/762* (2022.01); *G06V 20/60* (2022.01); *H04N 1/40012* (2013.01)

(58) Field of Classification Search
CPC .. G06V 10/759; G06V 10/762; G06V 10/449; G06V 20/60; H04N 1/40012
See application file for complete search history.

(56) References Cited

U.S. PATENT DOCUMENTS

| | | | | |
|---|---|---|---|---|
| 6,763,148 B1 * | 7/2004 | Sternberg | ............... | G06V 20/00 |
| | | | | 707/E17.02 |
| 9,183,460 B2 * | 11/2015 | Zhang | .................. | G06V 10/758 |
| 10,339,378 B2 | 7/2019 | Panferov et al. | | |
| 2003/0190075 A1 * | 10/2003 | Averbuch | ............... | G06V 10/28 |
| | | | | 382/199 |
| 2007/0127822 A1 * | 6/2007 | Boose | .................... | G06T 7/001 |
| | | | | 382/218 |
| 2008/0273807 A1 * | 11/2008 | Dauw | .................. | G06V 10/761 |
| | | | | 382/237 |
| 2013/0083996 A1 * | 4/2013 | Prasad | ................ | G06F 18/2178 |
| | | | | 382/159 |
| 2013/0294700 A1 * | 11/2013 | Kaftory | .................. | G06V 10/40 |
| | | | | 382/195 |
| 2019/0164449 A1 * | 5/2019 | Kems | .................... | G06V 30/414 |

(Continued)

FOREIGN PATENT DOCUMENTS

RU    2673396 C1    11/2018

OTHER PUBLICATIONS

Bhatia, Akshay, Hessian-Laplace Feature Detector and Haar Descriptor for Image Matching, Uottawa.ca, Masters Abstracts International, vol. 46-03, p. 1645, 2007 (Year: 2007).*

*Primary Examiner* — Henok Shiferaw

(74) *Attorney, Agent, or Firm* — Erise IP, P.A.

(57) ABSTRACT

Methods, system, and media for comparing a set of images to determine the existence and location of any differences between the image set. The differences may be located using image comparison techniques such as SURF and Blob Detection, as well as through techniques used to identify areas of data sliding and match probabilities. A logical match probability, as well as a physical match probability, may be included in an output report with a result image highlighting the differences between the comparison images in the image set.

20 Claims, 7 Drawing Sheets

(56) References Cited

U.S. PATENT DOCUMENTS

| | | | |
|---|---|---|---|
| 2020/0233900 A1* | 7/2020 | Acuna | G06F 16/532 |
| 2020/0380261 A1* | 12/2020 | Chandran | G06V 10/764 |
| 2023/0092401 A1* | 3/2023 | Plummer | G06K 7/10722 |
| | | | 235/462.41 |
| 2024/0168966 A1* | 5/2024 | Whilden | G06F 16/244 |

* cited by examiner

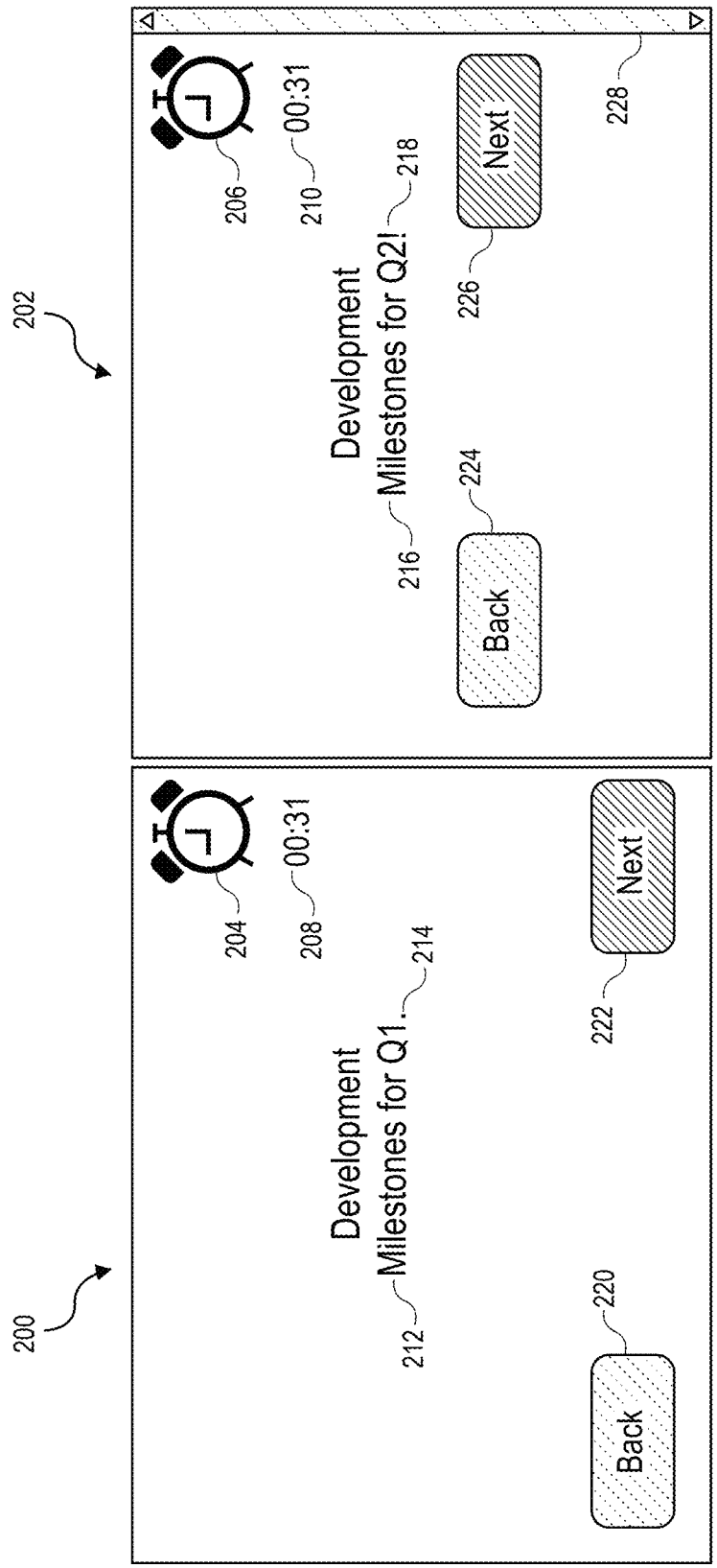

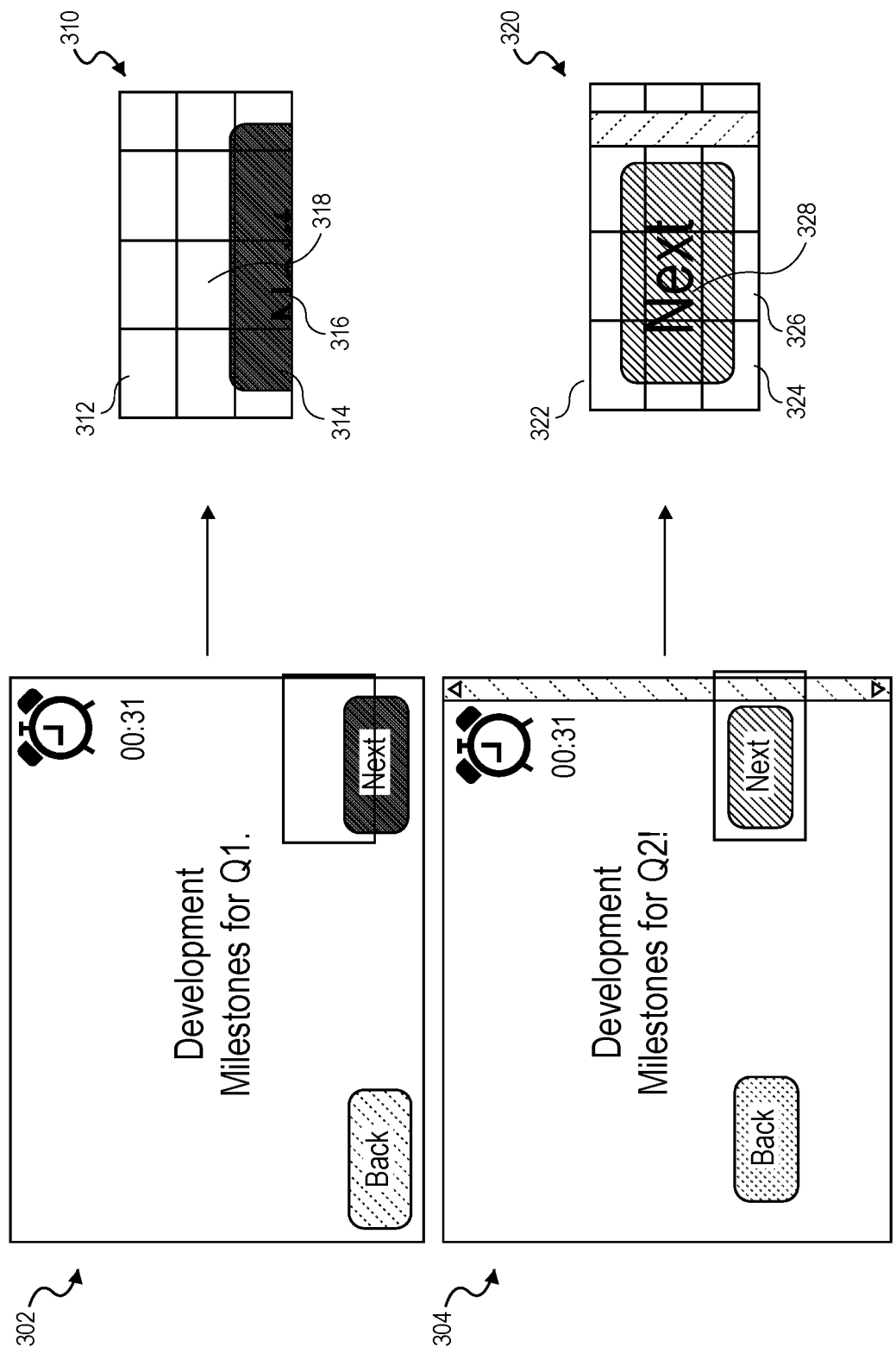

ELECTRONIC IMAGE COMPARISON AND MATERIALITY DETERMINATION

BACKGROUND

1. Field

Embodiments of the invention relate to comparing electronic or digital images. More specifically, embodiments of the invention relate to identifying differences between two or more electronic or digital images and evaluating whether the difference is material to the image.

2. Related Art

Current methods of image comparison rely on raw data processing to determine how similar, or dissimilar, two images are from one another. For example, a difference between two images may be measured by determining the fraction of pixels that are different between the two images. However, electronic or digital images may be formed of text, graphics, or other objects (and the associated colors, fonts, and other characteristics forming the objects) located at various panes, blocks, or other locations on the display. Perceptually slight differences to images caused by repositioning of these objects can result in a large number of altered pixels, resulting in perceptually similar images that are evaluated as being very different. For example, a user may not notice if a text object is moved by a small number of pixels within an object. However, in other circumstances, slightly relocating objects may, for example, move a text object to be overlaid on a graphic, obscuring both the text and the image in the rendered graphic. In a circumstance where even a relatively small location difference in text of the rendered display obscures the text or makes it difficult to read, such a difference is material.

Other methods for image comparison, such as edge detection, corner detection, and blob detection only discern a specific type of difference between two images, such as text or image differences or location of objects on the rendered image. Thus, current methods do not account for identifying a variety of types of alterations between images yielding perceptually similar results. Instead, these methods will enhance any minute differences between images, such that a small difference, e.g., a difference that does not materially affect the substantive information displayed or readability or aesthetic of the rendered image, may be incorrectly equated to a large difference. Using known techniques, a computer or application may then calculate a relatively large difference between the first and second images, when they are in fact sufficiently similar for purposes of an accurately rendered image.

What is needed is techniques for image comparison that identify a plurality of types of differences between images and that further determines whether an identified difference meets or exceeds a pre-determined materiality threshold, where such pre-determined materiality threshold is based on factors such as the existence of novel objects, data sliding, and cluster match probability. Embodiments described herein may use weighted calculations to analyze a comparison of two images such that minute differences are not emphasized and only large differences are highlighted. Further, embodiments described herein substantially decrease the time necessary for an application or a computer to compare two images.

SUMMARY

Embodiments of the invention solve the above-mentioned problems by providing a system and method of comparing two or more images by calculating a logical match percentage that accentuates large differences while negating small differences between two or more images. A plurality of images may be obtained to determine matched and unmatched areas. Images containing unmatched areas may be flagged for further comparison to determine how different the images are from one another. The unmatched areas may subsequently be converted to a format suitable for rapid comparison. These formats of the images may be analyzed and divided into matrices based on differences between the background and the foreground. These matrices may then be compared against one another to determine which areas contain differences. Any differences identified may be weighted to calculate the logical match percentage to identify the overall difference more precisely between the images.

In some aspects, the techniques described herein relate to one or more non-transitory computer-readable media storing computer-executable instructions that, when executed by one or more processors, perform a method of comparing images, the method including: receiving a first image to be compared and a second image to be compared; converting the first image to be compared and the second image to be compared to grayscale; identifying a first plurality of unmatched regions in the first image to be compared; identifying a second plurality of unmatched regions in the second image to be compared; identifying each first unmatched region in the first plurality of unmatched regions with a corresponding second unmatched region in the second plurality of unmatched regions to obtain a plurality of image differences; for each image difference in the plurality of image differences, calculating a corresponding logical match percentage; for each image difference in the plurality of image differences, determining whether the image difference is a significant image difference based on the corresponding logical match percentage to obtain one or more significant image differences; and generating an image match report including the one or more significant image differences.

In some aspects, the techniques described herein relate to a non-transitory computer-readable media, the method further including: comparing image properties between the first image to be compared and the second image to be compared; and in response to identifying different image properties between the first image to be compared and the second image to be compared, adjusting the image properties of at least one of the first image to be compared and the second image to be compared.

In some aspects, the techniques described herein relate to a non-transitory computer-readable media, wherein identifying each first unmatched region in the first plurality of unmatched regions with the corresponding second unmatched region in the second plurality of unmatched regions includes: performing cluster analysis of the first plurality of unmatched regions and the second plurality of unmatched regions, wherein the first unmatched region is assigned into a first cluster; and comparing the first unmatched region to a plurality of candidate unmatched regions from the second plurality of unmatched regions in the first cluster.

In some aspects, the techniques described herein relate to a non-transitory computer-readable media, wherein identifying each first unmatched region in the first plurality of unmatched regions with the corresponding second unmatched region in the second plurality of unmatched regions includes: identifying an instance of data sliding between the first unmatched region and the corresponding second unmatched region.

In some aspects, the techniques described herein relate to a non-transitory computer-readable media, the method further including: Identifying a novel object in the second image to be compared relative to the first image to be compared.

In some aspects, the techniques described herein relate to a non-transitory computer-readable media, wherein identifying each first unmatched region in the first plurality of unmatched regions with the corresponding second unmatched region in the second plurality of unmatched regions includes: performing a first blob detection on the first unmatched region; performing a second blob detection on the corresponding second unmatched region; and comparing one or more first blobs identified in the first blob detection with one or more blobs identified in the second blob detection.

In some aspects, the techniques described herein relate to a non-transitory computer-readable media, wherein performing blob detection on the first unmatched region includes: using a blob detection technique selected from a set consisting of: a Laplacian-of-Gaussian algorithm, a Difference-of-Gaussian algorithm, and a Determinant-of-Hessian algorithm.

In some aspects, the techniques described herein relate to a method of comparing images, including: receiving a first image to be compared and a second image to be compared; identifying a first plurality of unmatched regions in the first image to be compared; identifying a second plurality of unmatched regions in the second image to be compared; performing cluster analysis of the first plurality of unmatched regions and the second plurality of unmatched regions; identifying each first unmatched region in the first plurality of unmatched regions with a corresponding second unmatched region in the second plurality of unmatched regions to obtain a plurality of image differences; for each image difference in the plurality of image differences, calculating a corresponding logical match percentage, for each image difference in the plurality of image differences, determining whether the image difference is a significant image difference based on the corresponding logical match percentage to obtain one or more significant image differences; and generating a comparison result image illustrating the one or more significant image differences.

In some aspects, the techniques described herein relate to a method, wherein the corresponding logical match percentage is based at least in part on a Euclidean Distance Logic calculation for the first unmatched region and the corresponding second unmatched region.

In some aspects, the techniques described herein relate to a method, wherein the corresponding logical match percentage is based in further part on a mode pixel value comparison between the first unmatched region and the corresponding second unmatched region.

In some aspects, the techniques described herein relate to a method, further including: generating an image match report including the one or more significant image differences, the comparison result image, and a plurality of corresponding logical match percentages.

In some aspects, the techniques described herein relate to a method, wherein each region in the first plurality of unmatched regions and the second plurality of unmatched regions corresponds to a region selected from a set consisting of: a text region, an icon region, and a shape region.

In some aspects, the techniques described herein relate to a method, wherein each region in the first plurality of unmatched regions and the second plurality of unmatched regions corresponds to a layer selected from a set consisting of: a foreground layer and a background layer.

In some aspects, the techniques described herein relate to a method, further including: converting the first image to be compared and the second image to be compared to grayscale.

In some aspects, the techniques described herein relate to a system for comparing images including: one or more processors; and at least one non-transitory memory storing computer executable instructions that, when executed by the one or more processors, perform a method of comparing the images, the method including: receiving a first image to be compared and a second image to be compared; identifying a first plurality of unmatched regions in the first image to be compared; identifying a second plurality of unmatched regions in the second image to be compared; identifying each first unmatched region in the first plurality of unmatched regions with a corresponding second unmatched region in the second plurality of unmatched regions to obtain a plurality of image differences; for each image difference in the plurality of image differences, calculating a corresponding logical match percentage; for each image difference in the plurality of image differences, determining whether the image difference is significant to identify one or more significant image differences; and generating an image match report including the one or more significant image differences.

In some aspects, the techniques described herein relate to a system, wherein the method further includes: identifying an instance of data sliding between the first unmatched region and the corresponding second unmatched region.

In some aspects, the techniques described herein relate to a system, wherein the image match report includes a plurality of logical match percentages and a plurality of physical match percentages.

In some aspects, the techniques described herein relate to a system, wherein identifying each first unmatched region in the first plurality of unmatched regions with the corresponding second unmatched region in the second plurality of unmatched regions includes a using technique selected from a set consisting of: a Laplacian-of-Gaussian algorithm, a Difference-of-Gaussian algorithm, and a Determinant-of-Hessian algorithm.

In some aspects, the techniques described herein relate to a system, wherein the image match report excludes at least one image difference determined not to be significant.

In some aspects, the techniques described herein relate to a system, wherein the image match report includes a comparison result image illustrating the one or more significant image differences. This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

BRIEF DESCRIPTION OF THE DRAWING FIGURES

Embodiments of this disclosure are described in detail below with reference to the attached drawing figures, wherein:

FIGS. 2A and 2B illustrate an embodiment of two comparison images to be compared by the application;

FIG. 3 illustrates some embodiments of the converted grayscale images at their matrix level to be compared by the application;

Figure 1:
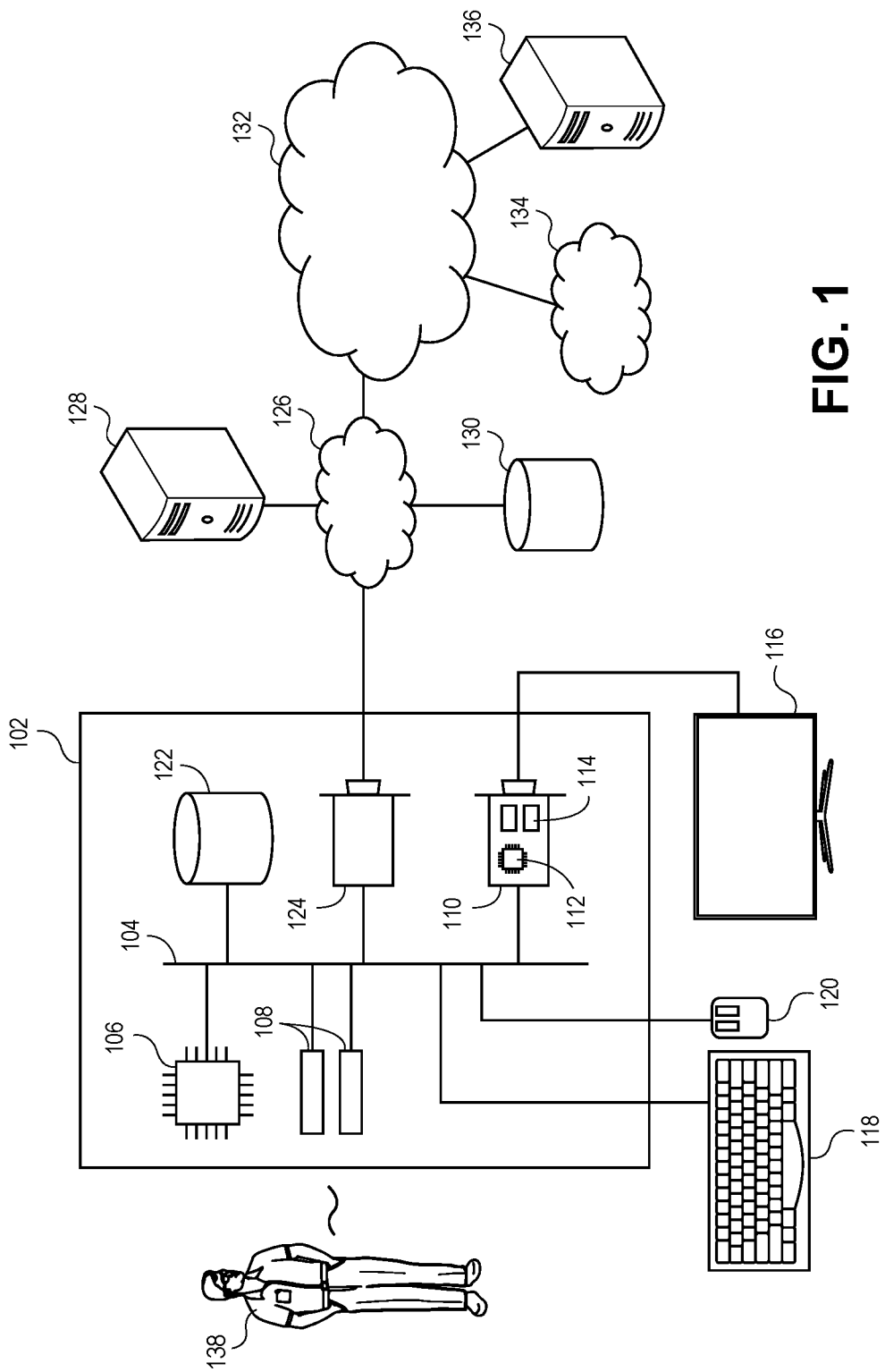
FIG. 1 depicts an embodiment of a hardware system for implementing embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

Embodiments of the invention provide a variety of benefits to a user, a company, or any entity attempting to compare a large set of images. As discussed above, an entity requiring high throughput image comparison may have a desire to specifically identify large differences between images while devaluing minute differences. Some embodiments employ weighted calculations to determine whether a difference between the images is considered small or large. A difference is identified as small or large through a predetermined materiality threshold. By highlighting only large differences between images, the application may pinpoint only those images that necessitate editing or revision to make the two images more similar. By way of example, this may be useful in cases where companies are updating web pages to adapt to new software, any form filing services (e.g., tax forms, Human Resource forms, etc.), etc. These methods decrease the time needed to compare and identify images having differences between each other. The subject matter of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made, without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment", "an embodiment", "embodiments", "various embodiments", "certain embodiments", "some embodiments", or "other embodiments" mean that the feature or features being referred to are included in at least one embodiment of the technology. Separate references to "one embodiment", "an embodiment", "embodiments", "various embodiments", "certain embodiments", "some embodiments", or "other embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Operational Environment for Embodiments of The Invention

FIG. 1 illustrates an exemplary hardware platform that can form one element of certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media and may be internally installed in computer 102 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store non-transitory data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations. In particular, computer readable media includes non-transitory computer readable media storing computer-executable instructions that, when executed, cause one or more processors to carry out operations.

Finally, network interface card (NIC) 124 is also attached to system bus 104 and allows computer 102 to communicate over a network such as local network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

In some embodiments, an application for comparing images may run on the computer 102 and the computer 128 which, in some embodiments, may be mobile devices or may be accessed via mobile devices and run in a web-based environment from a web browser of any entity that is comparing images. The web-based environment may store data such that it is not required for the mobile device or computer to have downloaded and stored large amounts of data for the application. Transmitters and receivers may be associated with any devices as described above for transferring data and communication. The application may access data such as object databases, image databases, form databases, financial information, third-party financial institutions, third-party vendors, social media, or any other online service or website that is available over the internet.

In some embodiments of the invention, the application may be downloaded on the mobile device which, in some embodiments, is computer 102 or accessed via the Internet as in a cloud-based application. In some embodiments, the application may access any of a plurality of peripheral devices of the mobile device such as a camera, microphone, GPS, or any other peripheral device that may be useful in embodiments as described below. The application may access any information from the mobile device such as, for example, GPS location, IP address, metadata, date and time, and mobile device type.

In some embodiments, a user 138 may have a stored account or, in the case of a first-time user, the user 138 may set up an account associated with the application. The application may store user information associated with or indicative of the user 138. The user information may be, for example, name, date of birth, social security number, address, financial information, medical history, tax information, and a history of any of the above, as well as any other information associated with or indicative of the user 138. This user information may be used to grant the user 138 access to the application, for example, when the images being compared contain sensitive information (i.e., tax information, financial information, health information, etc.).

Output of a Matched Image

FIGS. 2A and 2B illustrate first exemplary comparison image 200 and second exemplary comparison image 202 that may be used for comparison. In some embodiments, the images in an image set may be given in a variety of file formats including, but not limited to, BMP, PNG, or JPEG. Regardless, each file format will generally provide the image pixels in a similar manner, with the same processed depiction, albeit with some possible variations in the image colors, properties, etc. In some embodiments, the image may be accessed as a file directly, such as when an image is retrieved on a computer through a data store. In other embodiments, the image may be accessed as its matrix form wherein the pixel information is received, with one or more pixels grouped within a single cell of the matrix.

Figure 2C:
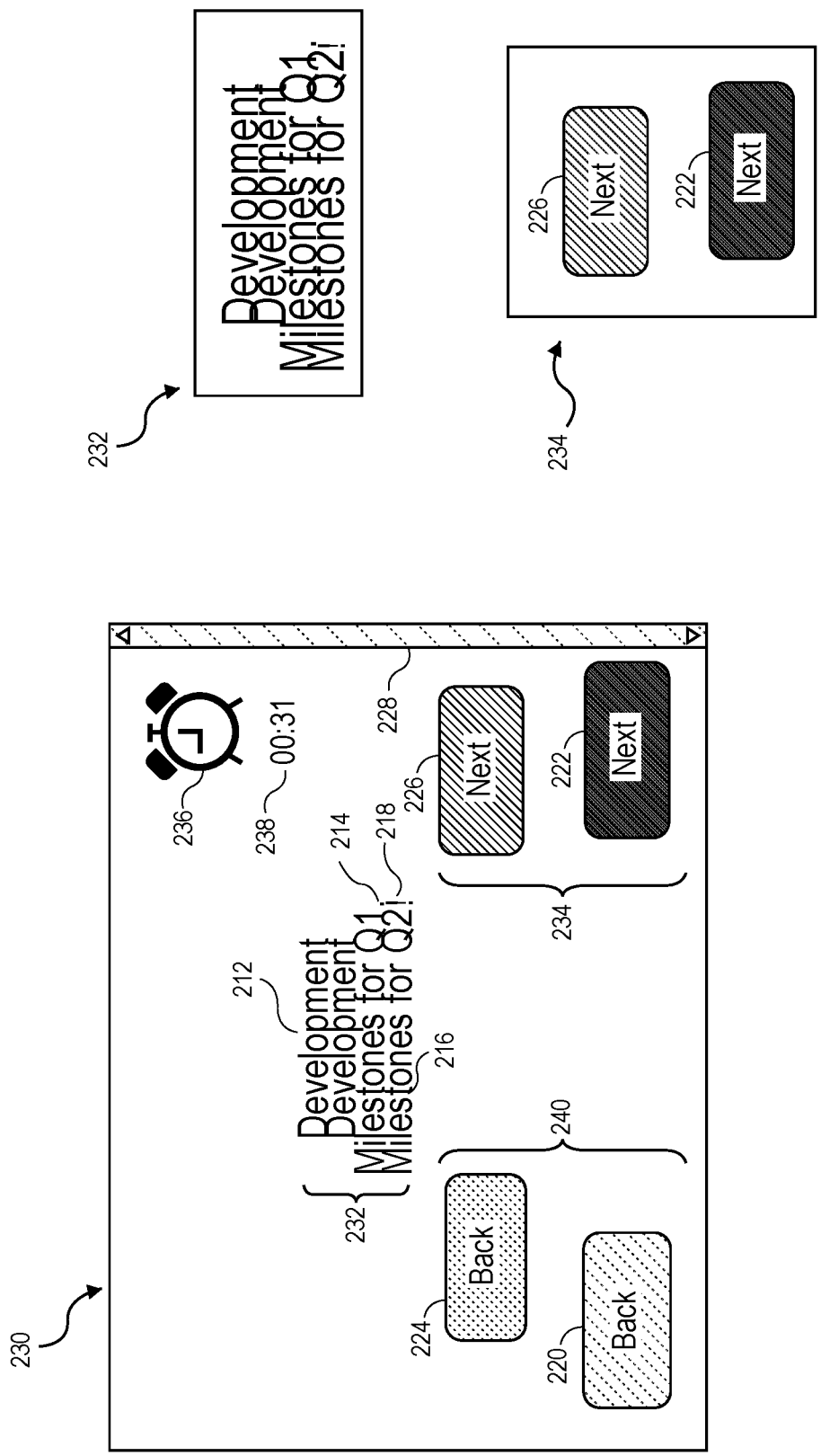
FIG. 2C depicts some embodiments of a result image following image comparison by the application.

FIG. 2A depicts first exemplary comparison image 200 and FIG. 2B. depicts second exemplary comparison image 202. In these comparison images, two distinct images are shown. In some embodiments, the images in an image set may illustrate webpages, portraits, etc. At first glance, it may be noticeable that first exemplary comparison image 200 and second exemplary comparison image 202 contain many similar objects such as icons 204 and 206, timers 208 and 210, text block 212 and text block 216, etc. However, though FIGS. 2A and 2B may present similar objects, these objects may be slightly changed in different manners between first exemplary comparison image 200 and second exemplary comparison image 202. For example, in reference to text block 212 in FIG. 2A and text block 216 in FIG. 2B, though the textual information appears to be similar in both images, the presentation has been slightly changed between images. In the case of text block 212, the text appears to be slightly higher in relevance to the remaining objects in the image in comparison to text block 216 in FIG. 2B and ends the phrase with a period 214. In the case of text block 216, the text appears to be slightly lower with relevance to the remaining objects in the image in comparison to the location of text block 212 in FIG. 2A and ends the phrase with an exclamation point 218. More so, in terms of the content of the textual information, the text differs in text block 212 and text block 216 with text block 212 referring to 'Q1' and text block 216 referring to 'Q2'. In some embodiments, the difference in the location of text block 212 and text block 216 illustrates the occurrence of data sliding in FIG. 2B, a process wherein a portion of an image, or a specific object in an image, has slid to a different location. This is further illustrated through button 220 and button 222 in FIG. 2A and buttons 224 and 226 in FIG. 2B, wherein data sliding has also occurred but in an opposing direction in comparison to the textual information. FIG. 2C depicts a result image, wherein the differences in FIGS. 2A and 2B are clearly outlined, with additional screenshots comprising the data sliding occurrences shown in first area 232 and second area 234.

As mentioned above and used herein, the term "data sliding" refers to any particular portion of the image that has been repositioned relative to the corresponding portion in a comparison image in an image set. In some embodiments, this may refer to a portion that is present in all of the comparison images in the image set, but in different locations. For example, with reference to first exemplary comparison image 200 and second exemplary comparison image 202 in FIGS. 2A and 2B, it may be determined that while both FIGS. 2A and 2B contain buttons, those buttons may be in slightly different locations as described above. While some elements, such as the buttons and textual information, may be evidence of data slide occurrences, images in an image set may also contain elements that remain in the same location in all of the images in the set. As with FIGS. 2A and 2B, the icons 204 and 206, as well as the timers 208 and 210, may be identified and determined to be in the same location in both figures.

In some embodiments, the comparison images in the image set may contain novel objects (e.g., novel object 228), objects that may be present in one or more of the images in an image set, but not all of them. Note that novel object 228 only appears in second exemplary comparison image 202 but is absent in first exemplary comparison image 200. In some embodiments, and as will be discussed in greater detail below with reference to FIG. 6, novel objects may be identified or flagged between the comparison images in FIGS. 2A and 2B. In some embodiments, methods disclosed herein may determine if the novel object comprises a specific object from a set of identifiable objects. For example, novel object 228 may comprise a scrollbar and may be identified as such (as in the case of FIG. 2B). Accordingly, method 500, method 600, or a combination of the two methods may account for how a scrollbar might cause differences between the comparison images (e.g., if scrolled down, the images may comprise a higher logical match percentage). For the purposes of the proposed invention, the comparison images illustrated in FIGS. 2A and 2B may be retrieved and used at step 504 of method 500 in FIG. 5.

In FIG. 2C, an embodiment of result image 230 is illustrated. For the purposes of this invention, a result image may identify and illustrate the differences between the images in a set of images. In some embodiments, the result image may present differences in a set of comparison images through the depiction of overlapping objects and distinctly novel objects. An example of a result image is depicted as result image 230 in FIG. 2C. In FIG. 2C, a multitude of overlapping objects, novel items, and closely adjacent objects is displayed. In particular, it may be determined that the lack of adjacent items or overlapping of items with novel object 228 may imply that novel object 228 is a novel item (e.g., a scrollbar). Similarly, in the case of icon 236 and timer 238, a complete overlap, as shown by the absence of a shift in result image 230, may imply that these elements were present in each of the comparison images at the exact same location. In some embodiments, a result image (e.g., result image 230) may be provided with screenshots on some of the identified non-negligible differences in the result image. As in FIG. 2C, first area 232 and second area 234 both emphasize areas of data sliding and overlapping that are illustrated in result image 230.

As seen in FIG. 2C, there may be overlapping or adjusted placement of the comparison images in FIGS. 2A and 2B to illustrate where the information lies in the original images and how the differences are presented. For example, as per button 224 and button 220, as well as buttons 222 and 226, that are encompassed in third area 240 and second area 234 respectively, it may be determined that the buttons were distinctly present in the first exemplary comparison image 200 and the second exemplary comparison image 202, but in slightly different locations as determined by the different positions of each button in result image 230. A similar instance may be seen in first area 232 which illustrates the slight data sliding occurrence between text block 212 and text block 216. Similarly, with novel object 228, it may be determined that because there is no indication of overlapping or adjacent scrollbars, novel object 228 is absent in first exemplary comparison image 200 and only displayed in second exemplary comparison image 202. In some embodiments, the result image 230 may consist of overlapping and adjacently placed objects if no novel objects were present in either comparison images. In other embodiments, a result image (e.g., result image 230) may consist of novel objects if the other objects in a comparison image set remain in the same locations. After providing a set of comparison images (e.g., first exemplary comparison image 200 and second exemplary comparison image 202) to the proposed invention, a result image (e.g., result image 230) that illustrates the identified differences between the image set may be generated at step 618 of method 600 in FIG. 6.

Figure 6:
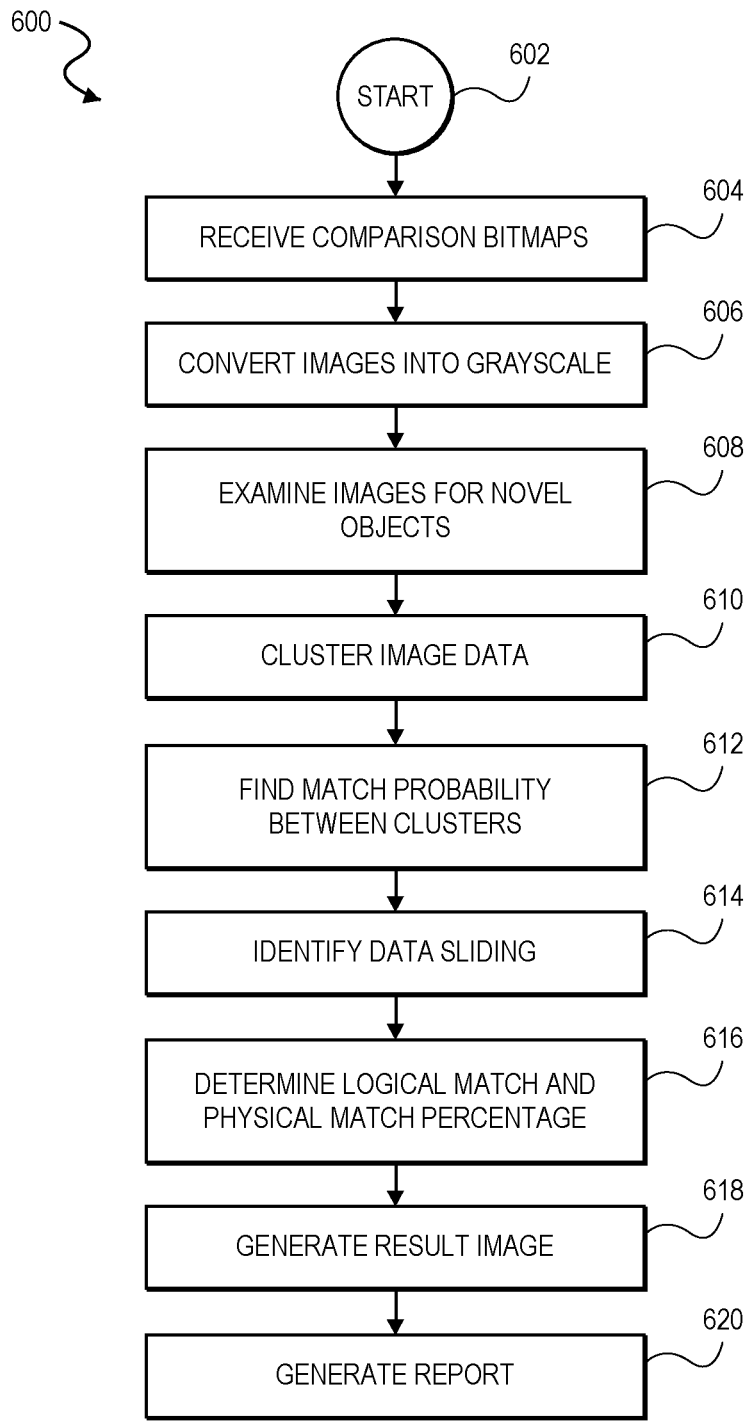
FIG. 6 is a flowchart relating to embodiments of the invention illustrated, at least in part, in FIGS. 2A-2C and 3.

FIG. 3 illustrates comparison images 302 and 304, each with identified regions such as region 310 and region 320 to proceed with the calculation of the match probability in FIG. 6. As shown in comparison images 302 and 304, method 600 may identify an equal number of blocks, at random, to begin the search for matching elements and occurrence of data sliding. In step 610 of method 600 in FIG. 6, method 600 clusters the images in the image set, with each cluster containing one or more regions similar to those illustrated in region 310 and region 320, In some embodiments, the matrices may be used in the application of the Euclidean Distance Logic in step 612 of method 600 wherein the method selects two or more spots at random in the matrices of the clusters of each comparison image to determine the distance between the two spots. In such a scenario, the calculated distance may be used to determine whether an identified difference is negligible. A more detailed summary of the matrices, and their role in the image comparison process, may be disclosed below.

Figure 4:
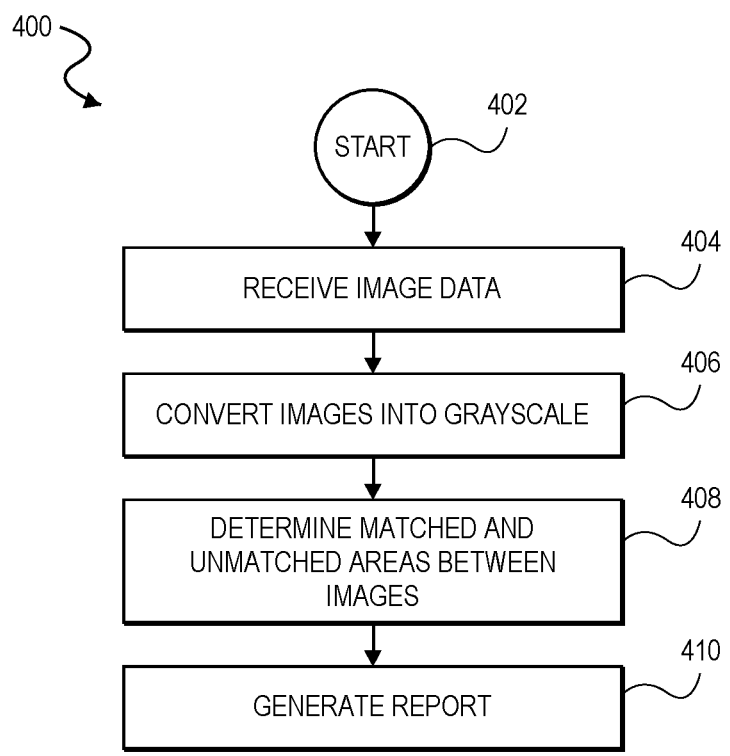
FIG. 4 is a flowchart relating to embodiments of the invention illustrated, at least in part, in FIGS. 2A-2*c* and 3.

FIG. 4 illustrates the operation of method 400 for performing image comparison. Initially, at step 402, method 400 begins. Step 402 may be initiated through an automatic trigger event wherein a computer 102 initiates method 400. In some embodiments, the trigger event may include any one or more of a time, date, In some embodiments, a user of computer 102 initiates method 400 (e.g., via an application). In another example, computer 102 receives a signal from another computer (e.g., computer 128 and/or computer 136) to start method 400.

At step 404, the image data comprising the comparison images is received. In some embodiments, the image data may comprise two images or two or more images. The image set may further comprise one template image that may be compared to one other image, or the image set may comprise multiple template images that may be compared to multiple other images. In some embodiments, the image data, as received, may comprise different properties and colors, and contain different objects. The image set may further be received in different file formats including, but not limited to, .PNG, .BMP, .JPEG, etc. The image data may be altered, as described in detail below, to ensure that relevant properties match and further comparison processes may be conducted. As will be discussed below in the description of method 500, some embodiments may include additional steps and processing of the image data once it is received.

After step 404, method 400 proceeds to step 406 to convert the images in the image set into grayscale images. In some embodiments, grayscale conversion may be generated through techniques such as the lightness method, the average method, etc. In some embodiments, the images from the image set may be converted into grayscale versions through a combination of the prior mentioned techniques. Further, in some embodiments, the images from the image set may be converted into grayscale versions through a method that accounts for the varying perceived intensities of the different color values. Conversion of the images into grayscale allows the process to calculate the image match probability percentages more quickly and with less computation than would be possible for colored images. In some embodiments, the conversion of the images into grayscale formats may allow for the images in the image set to be examined more realistically; rather than to mark every located difference, the use of grayscale images may make it easier to identify a difference and determine whether it comprises a significant difference between the images in the image set. As will be discussed below in the description of method 600, some embodiments may include additional steps and processing of the grayscale conversion process.

In step 408, method 400 determines where the matched and unmatched areas lie between a set of images. In some embodiments, this determination may be calculated through existing techniques including, but not limited to, blob detection, SURF, and/or Euclidean Logic Distance. In some embodiments, this determination may be calculated through techniques that search for instances of data sliding, novel objects, and similar properties in the set of adjusted images. The adjusted images may be compared at a pixel matrix level, as shown in region 310 and region 320 in FIG. 3. As shown in s region 310 and region 320, the application the Euclidean Distance Logic formula may involve choosing two random blocks in each region (e.g., comparing block 312 and block 314 in region 310 to block 322 and block 324 in region 320 and/or comparing block 316 and block 318 in region 310 to block 326 and block 328 in region 320, etc.) to determine their distance and to identify any negligible differences. The adjusted images may be stored as matrices prior to starting to search for the matched and unmatched areas between the set of adjusted images.

In some embodiments, the presence of a matched area may be detected by the calculation of a match probability between clusters. In some embodiments, the clusters may be chosen at random, amongst the adjusted image, and used to calculate multiple relevant probabilities such as match probabilities, logical match percentages, etc. to determine whether any matched or unmatched areas lie in that particular group of clusters. Step 408 may comprise selecting multiple clusters, at random, and similarly searching through them to determine the presence of novel objects, instances of data sliding, etc. and further determining whether a located difference may be considered miniscule. Once the adjusted images have been scanned, step 408 may conclude with the generation of a result image that highlights the non-negligible differences identified between the set of images in the adjusted image set. An example of such a scenario may be seen by considering first exemplary comparison image 200 and second exemplary comparison image 202 from FIGS. 2A and 2B as two example images in an image set and result image 230 from FIG. 2C as the generated result image. As will be discussed below in the description of method 600, some embodiments may include additional steps and processing of the data clustering once it is received.

At step 410, a report is generated, and the image comparison method may be concluded. In some embodiments, the report may comprise a result image that identifies the differences in the set of images (e.g., result image 230). In some embodiments, this report may contain copies of the original comparison images in the image set and any locations of matched and unmatched areas. Furthermore, the report may include physical match probabilities and logical match probabilities. Broadly, the report provides a summary of the results received from the process.

Figure 5:
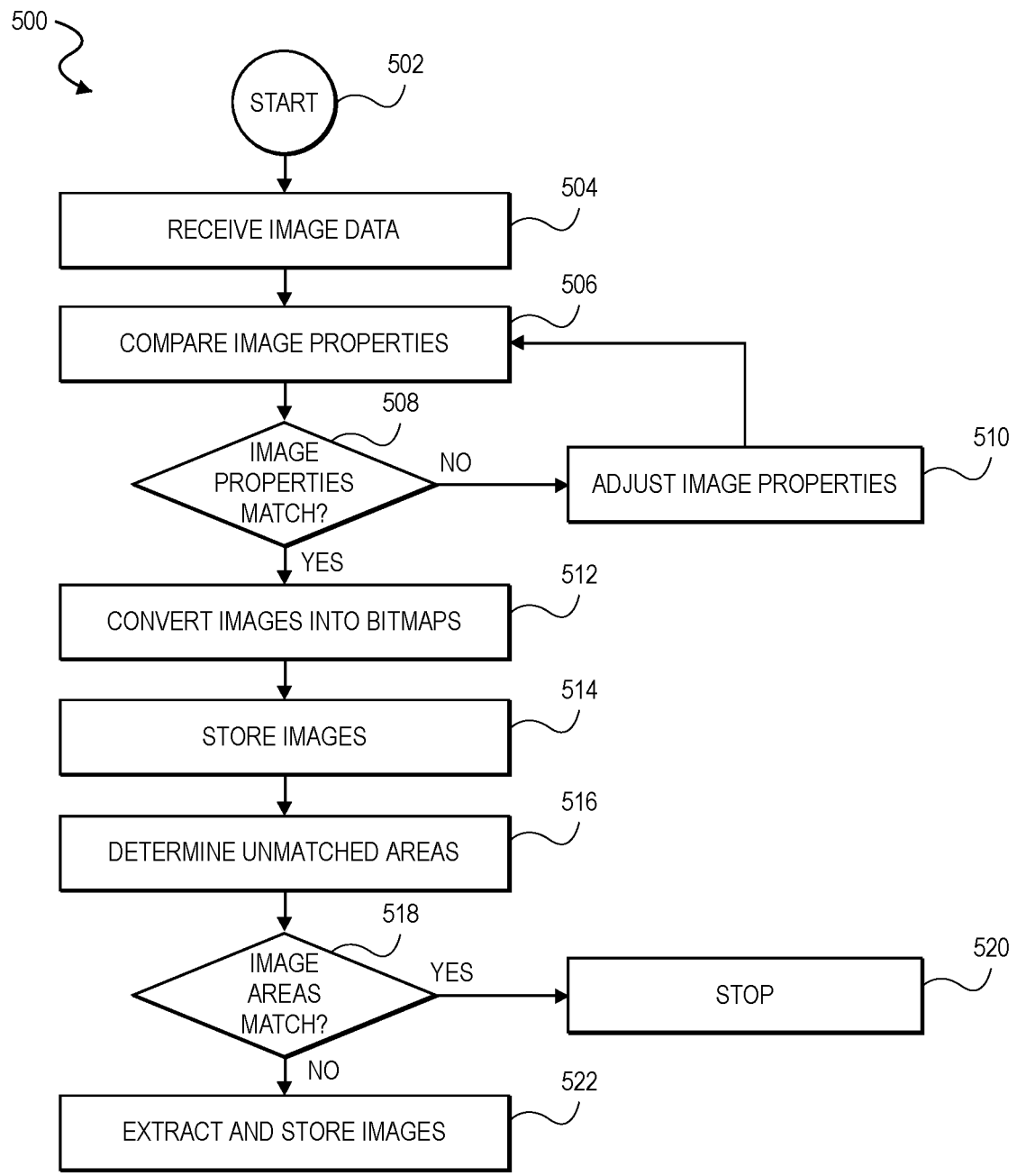
FIG. 5 is a flowchart relating to embodiments of the invention illustrated, at least in part, in FIGS. 2A-2C.

FIG. 5 illustrates the operation of method 400 for determining unmatched areas between two or more images. Initially, at step 502, method 500 starts. In an example of step 502, a user of computer 102 initiates method 500 (e.g., via an application). In another example of step 502, computer 102 automatically initiates method 500 due to a trigger event. In some embodiments, the trigger event may include any one or more of a time, date, storage capacity being reached, etc. In another example, computer 102 receives a signal from another computer (e.g., computer 128 and/or computer 136) to start method 500.

At step 504, image data is received. As used herein, the term "image data" refers to one or more images to be used for manipulation, comparison, or a combination of both. Image data particularly refers to the pixel data of one or more images. In some embodiments, the image data may refer to the pixel data as it is retrieved or received in a matrix format. This may involve pixel information with specific disclosure of colors, objects, placement of objects, etc. In some embodiments, the image data for the set of images may differ in its placement of objects or colors. In some embodiments, the image data may differ in the presence of novel objects. Altogether, the image data from a set of images may entail different characteristics, even if there are multiple similar objects present.

In some embodiments, the image data comprises data regarding a set of images, which may be two images or more than two images. For example, the set of images may be two images to compare to each other, one image as a template image and one or more other images to compare to the template image, or any number of images to compare to one or more other images. In some embodiments, the image data may be received via a user selecting, providing, or otherwise choosing the image data. In some embodiments, the set of images may be received via a user selecting, providing, or otherwise choosing the images. For example, the user may select image data from all the available images stored on computer 102. In other examples, the image data may also be received from one or more memory locations or from an external storage device.

At step 506, the image properties of the set of images are compared. In some embodiments, step 506 focuses on the comparison of the color depth and resolution of the two or more comparison images. In some embodiments, the color depth and resolution of an image are amongst the image properties that are compared in method 500. As used herein, the term "color depth" refers to the number of bits used to present a color in the pixel of an image. For example, different images may have 1 bit per pixel (i.e., be monochrome), 24 bits per pixel (8 bits for each of red, blue, and green), more or fewer. Embodiments are contemplated that operate on images with any number of bits per color. In some embodiments, a change of color depth may be detected in an image comparison method. For the purposes of the present disclosure, the comparison images in the image set should ideally have the same or similar color depth prior to being stored for further comparison. Further, for the purposes of the proposed invention, the resolution of each comparison image in the image set should ideally match (i.e., the images should be the same number of pixels wide and the same number of pixels high). In a scenario wherein the resolution (and/or color depth) of one or more comparison images in the image set do not match, the images' resolution, along with any other pertinent unmatching image properties, may be adjusted in method 500 before proceeding further.

This comparison may include one image compared to a different image, one image compared to multiple images, or one set of images being compared to a different set of images. In some embodiments, the determination may be calculated through a two-step process wherein the image property information is first received and then compared. This two-step process may begin by receiving the image property information from a computer program, such as Photoshop™, which provides the color depth and resolution of an image, or through the metadata of an image. In some embodiments, the property information may be automatically determined. Once the image property information has been obtained, it may be compared through calculations automatically performed by a computer. For example, the resolution of image A and image B may be determined to be 1024×768 and 1600×1200, respectively. In this example, step 506 may determine that the resolution of image B is greater than the resolution of image A and the images' resolutions do not match. Step 506 concludes with the numerical data regarding the color depth and resolution of the comparison images in the image set.

Step 508 is a decision step to determine if the image properties match in the image set. In some embodiments, method 500 will use the numerical data received from step 506 to determine if the color depth information and the resolution information of the set of images matches. If the image properties do not match, method 500 will proceed to step 510 wherein the image properties are adjusted. If the image properties are determined to match at step 508, method 500 may proceed to step 512.

In step 510, the image properties may be adjusted. In an example of step 510, the adjustment of image properties may be similarly conducted to the procedures detailed in step 506. If the properties of one of the images or a group of images need to be adjusted, this can be performed automatically by a computer, or by the user employing a computer program, such as Photoshop™. For example, in some embodiments, if a computer program such as Photoshop™ is used, the editing feature may be utilized to adjust an image's color depth and/or resolution, so that the two or more images' color depth and resolution match. Once step 510 concludes, method 500 may return to step 506 to compare the image properties. In some embodiments, if the images' properties are determined to not match at step 508, method 500 may continuously proceed to step 510 to adjust the image properties until the properties match. Method 500 may only proceed to step 512 once the image properties are determined to match.

In step 512, the images in the image set that are not received in the bitmap format may be converted to bitmap format. For example, method 500 may first determine whether the comparison images in the set of images have a bitmap type file extension. In some embodiments, if the image file extension is of type .JPG, .JPEG, .PNG, .PDF, etc. but not .BMP or .DIB, the images may be converted into a suitable format, like bitmap (.BMP or .DIB file extension), so that they can be stored in manner that allows for subsequent steps. In some embodiments, by storing the image data in bitmap structures for image processing, the invention may identify the differences between the set of images more quickly.

With reference to step 512, an image may be converted into a different file format. In doing so, in some embodiments, there will be transfer of pixel data from one file format to another. This may result in the loss or gain of certain image information. Since bitmaps store images without compression or encoding, the conversion of a non-bitmap image from its previous form into a bitmap form may result in a larger image size than the prior format. Advantageously, a bitmap file may represent the image in a matrix format, with rows and columns, within which the matrix cells encode data regarding the colors of the pixels used in the image. In some embodiments, the file conversion from an image file with a .JPG, .JPEG, .PNG, etc. extension to one with a bitmap type file extension may be done automatically or by the user employing computer programs such as Photoshop™. Once all comparison images have been converted and stored as bitmap files, method 500 may proceed to step 514.

In step 514, method 500 stores the set of comparison images in appropriate bitmap format. In a scenario wherein the images in the image set are already in bitmap format, method 500 arrives at step 512, step 514 may copy the input files or utilize them in place. In some embodiments, one of the images may be stored in one area and the other images may be stored in another area, the entire set of images may be stored in one area, or some of images from the image set may be stored in one area while the remaining images from the set may be stored in a different location. Once the images have been appropriately stored, method 500 may proceed to step 516.

In step 516, method 500 compares the images in the set of images to determine if there are any unmatched areas between the images. Comparison may be performed using techniques such as Speeded-Up Robust Features (SURF) method, template matching, and blob detection. Broadly speaking any image comparison algorithms are contemplated for use with the discloses techniques.

The SURF method is a fast algorithm used to detect local, similar components that lie in a set of images and comprises two steps: 1) feature extraction; and 2) feature description. In the feature extraction step, SURF relies on the use of box filters to quickly identify points of interest in an image. The technique begins by summing up the pixel values, which may be particularly helpful as it allows for quick computations of the box type convolution filters. As used herein, the term "convolution" refers to one or more filters applied to one or more comparison images in an image set. These filters may be applied to blur or clarify certain parts of an image, such as edges or objects. In some embodiments, convolution filters are applied using techniques including, but not limited to, Laplacian-of-Gaussian filters and Hessian matrices, both of which are described in further detail below.

In some embodiments, the method continues to calculate the determinant of the Hessian matrix to identify key interest points using blob detection techniques. SURF's use of the matrix's determinant further results in better performance in computation time and accuracy. In some embodiments, a Gaussian kernel is used to filter the image, in numerous ways, prior to the Hessian matrix computation.

Broadly speaking, blob detection techniques may analyze images at varying scales for analysis. A single-parameter family of smoothed images (called the "scale space" for the image) can be represented in a pyramid format. In some embodiments, the parameter of the scale space may be the size of the smoothing kernel used for suppressing fine details. For example, when using a Gaussian filter, the parameter may be the Gaussian variance. Alternatively, the scale spaces may represent an image that has been repeatedly compressed, parameterized by the number of compressions. In both scenarios, scale spaces may be used in image processing to detect similarities or differences in a set of comparison images.

In one embodiment, the images are smoothed with a Gaussian filter and different-sized box filters (orientations for a steerable filter) are applied to the images at each level of the pyramid. With the filters applied, SURF begins the feature description step by determining the orientation with the largest sum value of vertical and horizontal wavelets in the pyramid. The orientation with the largest sum value will act as the main and central area for the feature descriptor. Once identified, the SURF method can build a square region centered around the identified orientation and split it into evenly squared regions. Within each sub-squared region, additional features are computed, and their wavelet responses are summed. This produces a collective descriptor vector of the image similarities.

Other techniques, such as template matching and blob detection, similarly identify matched and unmatched areas within a set of images. For example, in some embodiments, template matching operates by laying one of the images (as a template) in the image set over the remaining images to identify the similarities between the images and produces an output image where the similarities are identified through rectangular blocks or a vector with image similarities and differences. By comparing each part of the template against the remaining images, the algorithm produces a similarity measurement percentage for specific parts of the images and uses a predefined threshold to determine if that percentage constitutes a valuable similarity prior to creating the output image. Any image from the image set may be used as the template. Broadly speaking, blob detection identifies areas within a set of images that differ in either brightness or color using one of a variety of techniques known in the art. This method is particularly useful in identifying novel objects, as is discussed further in detail at step 608. Altogether, step 516 constitutes using one, more than one, or a combination of the above-mentioned techniques, or a similar technique, to determine if and where the unmatched areas lie in the set of images.

At step 518, a decision is made regarding where the unmatched areas are located in the images of the image set. Using the descriptor outputs from the techniques employed in step 516, method 500 may now have information regarding where the extracted unmatched areas lie between images in the set of images. In step 518, the descriptor information from step 516 may be used to identify and store the unmatched areas between the images. If all areas match between the images, method 500 proceeds to step 520 and the method terminates. If only matched areas are located, the process stops as the discovery of all matched areas indicates that the set of images contain identical images. On the other hand, if the comparison uncovers an unmatched area between the images, method 500 identifies the unmatched area and retains unmatched area data corresponding to the unmatched areas that may be used in step 522. This process may continue for all of the images in the image set, or the entire image to be compared, further retaining unmatched area data corresponding to any additional unmatched areas uncovered. In such a scenario, unmatched area data may be significant enough for method 500 to deduce that the set of images does, in fact, contain image differences. Accordingly, method 500 may proceed to step 522 and, subsequently from there, to method 600.

In step 522, information of the unmatched areas in the image is extracted and stored. For example, the image set may be processed, particularly looking for the unmatched areas. Once found, the unmatched areas within the images are extracted and cached in an in-memory structure or on disk for later use. The use of an in-memory structure, as opposed to a disk or database, is especially advantageous because it may operate at a greater speed than storage on a disk or database. The in-memory structure may store the pixel data and metadata of the unmatched areas and mark them with a unique identification marker. Step 522 continues to do this for all the unmatched areas in the image set.

FIG. 6 illustrates the operation of method 600 for performing image comparison. In some embodiments, method 600 may be a continuation of method 500 and may be used to determine the logical match percentage and the physical match percentage between the comparison images. As used herein, the term "physical match percentage" refers to a percentage based on the matching qualities of the entire visual view of a set of comparison images. In some embodiments, the physical match percentage may be calculated through pixel-by-pixel comparison or byte-by-byte comparison and include negligible differences in its comparison. By contrast, the term "logical match percentage" refers to a percentage calculated based on the entire visual view of a set of comparison images, while ignoring or devaluing negligible differences. In some embodiments, the logical match percentage only calculates a percentage based on the visually noticeable changes. In its computation, the logical match percentage may conduct a bit-by-bit analysis and use an array of data including, but not limited to, data cluster sizes, stored data sliding information, and Euclidean Logic Distance calculations.

At step 602, method 600 begins. In some embodiments, step 602 may be determined to be a continuation of method 500. The step 602 may begin by retrieving relevant information obtained from method 500. In some embodiments, this information may comprise the storage location of the image files and similar data. Once retrieved, method 600 may continue to step 604.

At step 604, the comparison bitmap images are received. In some embodiments, the comparison image set may consist of two images or more than two images. In an example of step 604, the images may be received from a storage location in a computer. The set of images may be stored in one area, or in multiple areas. In other embodiments, the set of images may be received through a database or an external memory stick such as a USB Drive or SSD.

Once the comparison bitmap images have been received in step 604, method 600 proceeds to step 606 wherein the images are converted from Red-Green-Blue (RGB) formats into grayscale. In some embodiments, one or more methods of RGB to grayscale conversion may be used, such as the lightness method, the average method, the luminosity method, or others.

As is known to those skilled in the art, in some embodiments, each pixel in an image may comprise three 8-bit values, wherein a single value is given for the total amount of red, blue, and green in that pixel. This value, now referred to as the 'pixel value,' may vary from 0 to 255 (a total of 256 values), wherein the two ends of this scale refer to the minimum and maximum amounts of the inclusion of specific color in a selected pixel. In the grayscale conversion of an image, conversion methods may work to use those pixel values to determine how light or dark a region should be in an image. For example, if a portion of an image is substantially red, green, or blue, as represented in its RGB version, that portion of the image may have substantially higher pixel values for that one particular RGB color. Similarly, the closer a portion of an image is to a shade of gray, the closer that portion of the image may have less bias towards a single RGB color. In its grayscale form, an image may be easier to use for comparison and faster, as opposed to the analysis of an RGB image wherein each pixel may contain multiple pixel values to analyze. A person of ordinary skill in the art will appreciate that other color spaces than RBG (such as, for example CMYK) may be used in certain images and can be converted to grayscale using analogous techniques.

In some embodiments, the lightness method may be utilized to generate grayscale images for a set of comparison images. The lightness method can generate a grayscale image by calculating the average of the minimum and maximum values among the RGB components. In particular, the term "lightness method formula" refers to a grayscale conversion formula that converts an RGB image into a grayscale format and is mathematically defined as follows:

$$\text{grayscale} = \frac{(((R, G, B)) + ((R, G, B)))}{2},$$

where "R" refers to the pixel value of red for a particular pixel, "G" refers to the pixel value for green, and "B" refers to the pixel value for blue. Thus, in some embodiments, the lightness method formula averages the color components with the highest and lowest contributions in the image. As known to those in the field, this method is preferred for specific situations over the average method or the luminosity method, because it need not use the value of the remaining RGB component (which is neither the minimum nor the maximum) in the calculation. The lightness method may be used where it is desirable to reduce contrast in the images being compared.

In other embodiments, the average method may be utilized to generate grayscale images for a set of comparison images. Here, the "average method formula" refers to a grayscale conversion formula that converts an RGB image into a grayscale format and is mathematically defined as follows:

$$\text{grayscale} = \frac{(R + G + B)}{3},$$

where "R" refers to the pixel value of red for a particular pixel, "G" refers to the pixel value for green, and "B" refers to the pixel value for blue. Broadly, the average method formula averages the values of the red, blue, and green intensities for each pixel in an image. Similar to the lightness method, the average method also averages the RGB components, but its main difference lies in the fact that it averages all three RGB components. In some embodiments, the lightness method may assign the same weight to each RGB component, with no bias towards the minimum, maximum, or any other pixel value.

In still other embodiments, the luminosity method may be used to generate grayscale images for the comparison images in the set of images. Here, the "luminosity method formula" refers to a grayscale conversion formula that converts an RGB image into a grayscale format and is mathematically defined as: grayscale=(($\alpha$*R)+($\beta$*G)+((1=$\alpha$=$\beta$)*B)), with ⟨ and ® having values between 0 and 1. In this formula, "R" refers to the pixel value of red for a particular pixel, "G" refers to the pixel value for green, and "B" refers to the pixel value for blue. In some embodiments, the luminosity method formula multiplies the red pixel value by a factor of ⟨=0.3, the green pixel value by a factor of ®=0.59, and the blue pixel value by a factor of (1=⟨=®)=0.11. By applying different weights for the different color components of an image, the luminosity method formula accounts for the different sensitivities of the human eye to the frequencies each of the colors (red, blue, green) in an image and accordingly applies a predefined weight to each respective color frequency to produce a grayscale image. In some embodiments, the produced grayscale image may be more representative of the human perception of average color intensity. In some embodiments, parts of this formula may be used, as written or in a refined manner, to convert the comparison images into grayscale images in method 600.

As a result of the varying sensitivities of the human eye to the frequencies of each of the RGB colors, method 600 may utilize a custom grayscale equation that adjusts the weights in the luminosity method to account for higher frequencies of blue and green light (i.e., shorter wavelengths) and lower frequencies of red (i.e., higher wavelengths). In some embodiments, this may result in a custom equation utilizing the base of the luminosity method formula, wherein the certain values of 0.59, 0.3, and 0.11 may be altered to further account for the visual perceptions of green, red, and blue light, respectively. In other words, the current invention may substitute the values of 0.59, 0.3, and 0.11 (as they are used in the luminosity method) with different, predefined values to provide an accurate grayscale image. For example, an alternative embodiment uses values of 0.2126, 0.7152, and 0.0722. Once the grayscale images have been generated, method 600 may proceed to step 608.

As used herein, the term "adjusted image data" or "adjusted image" refers to the comparison images in the image set after they have been converted (e.g., into grayscale). This term may be used in description of the steps of method 600 as per FIG. 6 and may refer to the grayscale images at their processed output image illustration or at their matrix level. In either scenario, in some embodiments, the adjusted images may be examined or compared to determine whether any novel objects are present and if they are, where they are located. In some embodiments, the adjusted images may also be used to determine where any differences between the images are located—such as overlapping, data sliding (as described below), etc. For the purposes of the remaining steps in method 600, any reference to 'adjusted image data' or 'adjusted images' will refer to the comparison images in the image set after they have been converted into grayscale images.

In step 608, method 600 examines the set of grayscale images in search for any novel objects, using a method of novel object detection technique. In some embodiments, there may be multiple novel object detection techniques that may be helpful in identifying similarities and differences between a set of images. In some embodiments, the novel object detection technique may be conducted using blob detection.

Blob detection is a technique that may be used to identify the differences, and specifically the location of novel objects, between a set of images. In some embodiments, this technique identifies blobs, defined as a part of the image that shares constant properties (e.g., pixel size, grayscale value, brightness, etc.), from their surrounding environment which may be a compilation of different properties. Furthermore, using grayscale images for blob detection may result in a greater accuracy in detecting novel objects—as opposed to using the RGB forms of the images—because it may be easier to identify bright objects from their dark backgrounds and vice versa. Blob detection may be applied through multiple algorithms including the Laplacian of Gaussian (LoG), the Difference of Gaussian (DoG), the Determinant of Hessian (DoH), as discussed above.

As described above with regards to the SURF technique, the Laplacian of Gaussian (LoG) algorithm can be used in object detection by applying multiple convolution filters at different areas and looking for the maximum filter response. In other words, this means that the Laplacian filters, generated by the summation of the appropriate Gaussian derivatives, are convoluted around the image at different scales with differently defined scale parameters. Amongst these scales, the operation may identify the locations with the maximum squared peaks at each scale and identify those areas as potential novel objects. This technique may be particularly advantageous because of its efficient identification of edges and boundaries, a key detail in image comparison. The technique may then compare the filter response for each potential novel object to a predefined threshold to determine whether the marked area meets the threshold to be considered a novel object. If the potential novel object's maximum value is determined to be greater than that of the threshold, the potential novel object may be determined to be a detected novel object and may be accordingly plotted.

Another potential algorithm to conduct novel object detection in step 608 is the Difference of Gaussian (DoG), an operation that detects novel objects by calculating the difference between images produced at different scales of a Gaussian filter. Subtracting one image from the other in this way preserves spatial information that lies between the range of frequencies that are preserved at the two scales. In some embodiments, the Determinant of Hessian (DoH) operator may be used to conduct novel object detection. When using the DoH operator, step 608 calculates the determinant of Hessian matrix over each potential scale and blob location, with maximum determinant values indicating the blobs. Broadly, the DoH method may be efficient in detecting edges, but may further identify the edges of the novel objects in an image to be the novel objects, rather than identifying them as the container within which the novel objects reside.

At step 608, any novel object detection technique (including those described above and other now known or later developed) is employed to identify objects present in one image but not the other. Through its application, one or more novel objects may be detected. In some embodiments, these items may include a scrollbar, a text object, a graphic icon, etc. In a case wherein a scrollbar (e.g., novel object 228) is detected in step 608, the one or both images may be shifted to account for the scrolling. In some embodiments, the scroll bar may be parsed to determine a current scroll position (using for example, a Laplacian operator to locate a blob within the scrollbar indicating the position). Altogether, these novel objects may be present as one novel object in a set of images, as multiple novel objects with varying properties in a set of images, or in other variations, these novel objects may be viewable on one side of one image, or on opposite sides in a set of images, or in different areas in a set of images.

At step 610, the adjusted image data which is not matched in the comparison image from the image set is clustered into data clusters, grouped by similar qualities. Broadly speaking data clustering (also known as cluster analysis) refers to assigning elements of a large set of data—in this case, the image data—into smaller clusters wherein each group is grouped by similar qualities in a higher-dimensional parameter space. In various embodiments, data clustering techniques such as k-means clustering, dbscan clustering, and others may be used individually or in combination to cluster the image data. In other embodiments, a custom data clustering method, that may use parts of the previously mentioned data clustering methods, may be utilized in step 610. In some embodiments, the use of data clusters may be efficient in making the image comparison process faster as the images are not being compared pixel-by-pixel but rather, by breaking the images in large parts for comparison. Through clusters, the parts may further be contained in accordance with similar characteristics and allow for thorough examination for differences.

In clustering the data, it may be pertinent to determine the object size for each region as they may not be of equal size. Though the background regions may be of the same size, as a result of their identical forms, the foreground layer regions may correspond to individual objects, each with distinct properties in size, color, etc. As used herein, the term "foreground" refers to part of an image that is closest to the viewer and/or camera. In some embodiments, the foreground layer may contain all of the objects in an image, some of the objects in an image, or none of the objects in an image. The foreground may also maintain pertinent data regarding object properties. In some embodiments, the foreground may overlay, partially or fully, the background of an image. By contrast, the term "background" refers to the layer of an image that is furthest from the viewer and/or camera. In some embodiments, the background layer may contain key objects or colors of an image. When clustering the data, method 600 may account for the differences in the foreground and background to determine the region size for various clusters.

As such, step 610 begins by identifying these individual objects in the adjusted image data. In some embodiments, these individual objects may be text objects, graphic icons, shapes, scrollbars, etc. They may be located in one area on one image, in different areas in multiple images, or in opposite areas in a set of images. Upon identifying the individual objects, the region size may be calculated based on the object height. In some embodiments, an entire object may be encompassed within a single region. For example, with reference to first exemplary comparison image 200 and second exemplary comparison image 202 in FIGS. 2A and 2B, button 220 and button 224 may be separately encompassed within their own data regions. At its matrix form within the region, the buttons may be visualized similarly to region 320 in FIG. 3, wherein the button region is further broken into sub-blocks that may be used to determine match probabilities.

In step 612, method 600 proceeds to find the match probability between the region in a given cluster formed in step 610 to match a given unmatched region to one of one or more candidate unmatched regions from a different image. While some techniques used to determine the probability of match rely on pixel-by-pixel comparison, some embodiments disclosed herein employ faster and more efficient techniques. In some embodiments, the match probability may be calculated through various techniques, such as through the identification of the mode pixel value in the grayscale pixel matrix and the application of the Euclidean Distance Logic formula on corresponding pairs of pixels. In some embodiments, such techniques may eliminate any negligible differences between a set of images. In other words, while most image comparison methods capture an array of differences between two or more images—including negligible differences—embodiments disclosed herein, may either capture the negligible differences or may disregard those differences in totality as to account for more perceptually prominent changes. In some embodiments, a threshold may be pre-defined to determine what type of difference constitutes a negligible difference.

To begin the calculation of the match probability, step 612 may begin by identifying a mode (the most commonly repeating value) pixel value for a random block of a region within a cluster. Then, if another region within the cluster has the same (or similar) mode pixel value for the corresponding block, the regions are more likely to correspond to one another (i.e., they have a higher match probability). Thus, for example, if one region has a given block that is mostly black, it is less likely to correspond to another region where that block is mostly white. In some embodiments, the mode for the block may be used to quickly rule out non-matching blocks. In some embodiments, the method may quickly determine the match probability of the adjusted images by taking the mode of one row of the matrix corresponding to the region, at random. Once two corresponding regions are identified, step 612 can classify the difference as negligible or significant.

In identifying and determining whether a difference may be considered a negligible difference, step 612 may proceed with using the Euclidean Distance Logic function to determine the difference between corresponding, randomly selected pixels for the two regions. As mentioned previously, a negligible difference may be defined as a difference that does not cause a substantial perceptual change in a set of images. In some embodiments, after choosing one or more random corresponding pairs of points, the application of the Euclidean Distance Logic formula may determine the distance between those two regions. More pairs of pixels can be included to improve accuracy at the cost of increased computation. For example, if the corresponding pairs of pixels have similar grayscale values, then the Euclidean distance between the regions will be small and the difference is likely to be negligible. By contrast, if one pixel in each pair is dark and the other is light, the Euclidean distance will be large, and the difference is more likely to be substantial. In some embodiments, if the Euclidean Distance Logic produces a difference value percentage that is less than a predefined threshold value, then the method may conclude that a negligible difference has been found. As such, the identified difference in the regions may be attributed to a multitude of factors such as color variation, miniscule data sliding, etc.—factors that do illustrate change but not to the extent that the images in the image set are drastically different from one another. In such a scenario, the method may disregard and eliminate that difference as a potential difference and proceed to the next pair of corresponding regions. On the other hand, in some embodiments, if the comparison of the distances produces a difference that is greater than a predefined threshold value, the significant difference may be added to a list to be included in the report and highlighted in the result image. Additionally, the information obtained from the comparison may be used to calculate a match probability percentage. Once each pair of regions has been matched and the difference categorized as negligible or significant, method 600 may proceed to step 614.

In an example of step 612, regions 310 and 320 from FIG. 3 may be used. In a possible scenario, method 600 may randomly choose block 312 in region 310 and block 322 in region 320 for comparison. First, the mode pixel values of the blocks are determined. Here, it may be the case that both blocks are mostly white (have a mode pixel value of substantially 255, for example), so the match probability is high. Step 616 then proceeds to sample pairs of pixels at random and apply the Euclidean Distance Logic. If the resulting Euclidean distance is small, the match probability is high, and the difference is negligible. In the case of block 312 and 322, however, the difference may be determined to be non-negligible as the color variation between the blocks may be significant (because block 322 contains a portion of button 226). As such, the match probability may be lower and regions 310 and 320 flagged for potential data sliding.

In step 614, method 600 identifies and clusters any data sliding between the set of adjusted images. In some embodiments, step 614 conducts a row-by-row comparison between the image clusters, comparing the matrix cells both horizontally and vertically, to determine whether any data sliding exists and if it does, in what areas. Data sliding may refer to any object or data in an image that is repositioned to a different location. Referring to FIG. 3, there are some areas wherein data sliding has occurred. For example, as discussed immediately above, comparison images 302 and 304 outline a particular instance of data sliding. With the match probabilities obtained in step 614, method 600 may further be able to analyze specifically identified areas where there may be suspicions of prominent differences to determine whether the difference is data sliding. An example of this may be seen in the comparison of block 312 and block 314, with block 322 and block 324, in region 310 and region 320 respectively. However, even without the match probabilities, step 614 may proceed with its horizontal and vertical examination to identify any and all instances of data sliding in an adjusted image set, as is disclosed in more detail below. As shown in result image 230 in FIG. 2C, the multitude of similar buttons (e.g., button 220 with button 224 and button 222 with button 226) as well as the overlap of text block 212 and text block 216 all illustrate relevant examples of data sliding.

In terms of identifying data sliding within a set of images, method 600 may perform an identification and comparison process, under the assumption that any occurrence of data sliding in a cluster must be within the limits of a predefined threshold based on the maximum object height and matrix size. To begin, step 614 may start a horizontal row-by-row comparison of a chosen data cluster formed of the first adjusted image in the image set, as well as the corresponding data clusters of the other adjusted images from the image set. This allows for comparison of each matrix cell within the two or more image clusters and determines if any matches are present. If the cells in one row do not match between image clusters, the method may proceed to the next row and continue to check for matches. Upon finding a match, the method may calculate and store the appropriate object repositioned data before proceeding with analysis of the subsequent rows. In some embodiments, if upon completion of the horizontal comparison no matches for data sliding are produced, the process may begin a vertical column-by-column comparison in a similar manner. Upon completion of either, or both the horizontal and vertical comparisons, any data sliding data identified in step 614 may be stored before proceeding to perform the comparison on all of the data clusters formed for each adjusted image in the set of images. Furthermore, any data sliding identified at step 614 may be used to calculate the logical match percentage. For example, the distance, offset, etc. of the data sliding may be used to determine whether the comparison images have a higher or lower logical match percentage.

In step 616, the object repositioned data information stored from step 614 may be utilized to calculate a logical match percentage and a physical match percentage for the set of adjusted images. In some embodiments, the physical match percentage generated for a set of images may produce a lower percentage than the logical match percentage because the physical match percentage may be a pixel-by-pixel comparison or similar literal distance metric. As such, the physical match percentage may look solely at the values of the pixel placed in the image set in their comparison and this percentage may be an optional calculation. In some embodiments, the logical match percentage is calculated through the use of the data region sizes, the Euclidean Distance Logic, the stored object repositioned data from step 614, and a given threshold value. In some embodiments, step 616 may further invoke use of the calculations that may have been determined in previous steps such as steps 612 and 614. Further, the logical match percentage may ignore any negligible or minute differences and rather, work to calculate a logical match percentage based on the visually noticeable and prominent differences. Once the logical match percentage and physical match percentage have been calculated, method 600 may proceed to step 618.

In step 618, a result image is generated that overlaps the images in the image set to illustrate the identified differences in the image set. Referring to FIGS. 2A and 2B, in some embodiments, first exemplary comparison image 200 and second exemplary comparison image 202 may act as two comparison images in an image set. At first glance, it may seem that first exemplary comparison image 200 and second exemplary comparison image 202 are identical, but upon closer inspection, a few differences may be noticeable. In some embodiments, the generated result image (e.g., result image 230) may illustrate these differences. For example, text block 212 in first exemplary comparison image 200 and text block 216 in second exemplary comparison image 202 are very similar in their content, but the period 214, exclamation point 218, the differences in 'Q1' vs 'Q2', etc. all illustrate small differences within the result image 230. Another example may be seen at button 220 and button 222 in first exemplary comparison image 200 and buttons 224 and 226 in second exemplary comparison image 202. In this example, while the information within the buttons remains the same, the placement of the buttons differs. In the case of third area 240 which comprises button 220 and button 224, there is a large variation in the location of the buttons in their respective images. A similar scenario may be seen within second area 234, comprising buttons 222 and 226. While some of these differences, and similar differences, may be difficult to catch through the human eye, the result image 230 clearly identifies these differences. The generated result image may show the differences between the comparison images by combining the comparison images and showing where any overlaps, changes, etc. occur. Once the image is generated, method 600 may continue to the last step.

In step 620, a report regarding the image differences may be generated. In some embodiments, this report may include the result image generated in step 618, along with the comparison images from the original image set and screenshots of the most prominent differences (e.g., first area 232 and second area 234 in FIG. 2C). This report may also include information about the logical match percentages and the physical match percentages and overall, provide a summary-style overview of the image comparison results. This report may also include a conclusive summary of the differences found and highlighted in the comparison images of the image set. In some embodiments, the report may contain a preview of the comparison images, the result image, and other textual information. In some embodiments, the report excludes negligible differences. In other embodiments, the report includes negligible differences. In still other embodiments, the report negligible differences in a separate section from the significant differences.

Exemplary Use Cases

In some embodiments, the proposed invention may be applied to new versions of government issued forms, such as IRS Forms. As IRS regulations may change year to year, their required forms may also change in properties such as textual information, required fields, placement, etc. In some embodiments, these forms may be accessible through web pages or downloadable file formats such as PDF, DOC, DOCX, etc. Embodiments of the invention may be useful in identifying the changes between the previous and new versions of IRS forms. In some embodiments, the form changes may be similar to the changes presented in FIGS. 2A and 2B. For example, button 220 and button 222 in first exemplary comparison image 200, as well as buttons 224 and 226 in second exemplary comparison image 202, differ particularly with regards with the placement of the blocks. However, the icon 204 and timer 208 in first exemplary comparison image 200 and the icon 206 and timer 210 in second exemplary comparison image 202 are still placed in the same locations, with the same properties and information. In some embodiments, a new IRS form may only include changes from previous forms, such as changes in textual information, required fields, placement, etc. In some embodiments, a new IRS form may contain a combination of objects that are placed in the same location and objects that have been changed from previous form versions. In either scenario, the proposed invention may be applied and used to identify the logical match percentage of the two or more forms. In some embodiments, the emphasized differences from the result image may be useful in identifying where a user must input their information. In some embodiments, the invention may be useful in determining what, if any, documents may be necessary for the completion of the form.

In other embodiments, the proposed invention may be applied to health documents such as appointment check-in documents, health history documents, and health insurance forms. In some embodiments, these forms may be present on web pages or in downloadable file formats such as PDF, DOC, DOCX, etc. In some embodiments, the techniques disclosed herein may be useful in identifying the changes between previously published and newer versions of health documents. Embodiments of the invention may be useful in identifying where the user must type or write information, whether that be due to a new field or to a previously existing field that may have been moved to a different location on the updated version of the health document. In some embodiments, the changes identified in the health document may be useful in determining whether certain vaccination, immunization, or similar records may be necessary to continue with an appointment. In such a scenario, the changes may be easily identified from the highlighted result image. Further, embodiments may be useful in identifying new features on a webpage. In some embodiments, these new features may contain 'Help Center', 'Save', or 'Print' options, each disclosed with icons similar to those displayed in icons 204 and 206 in first exemplary comparison image 200 and second exemplary comparison image 202, respectively.

In some embodiments, the disclosed techniques may be useful in identifying changes between a set of tumor scan images. This set may contain, but is not limited to, two comparison scan images or more than two comparison scan images. The tumor scan image may consist of a single tumor or a group of tumors. In some embodiments, this may involve identifying the differences between scans that may be taken over a period of time. This period of time may include, but is not limited to, three months, six months, twelve months, etc. In some embodiments, the highlighted result image may be useful in identifying whether a tumor, or a group of tumors, have shrunk or grown in size. In some embodiments, the highlighted result image may further be useful in determining whether the placement of the tumor, or group of tumors, has changed or remained stationary. The tumor scan images may be accessible through web pages or through downloadable attachment files such as PDF, DOC, DOCX, etc. In some embodiments, the result image that may be produced from the proposed invention may look similar to result image 230 in FIG. 2C, wherein the changes between the scan images may be emphasized in a particular portion of the result image. In other embodiments, the produced result image may have highlights at various areas in the image.

As one example, embodiments of the invention may be useful in identifying changes between previous and new versions of one or more legal documents. The legal documents may include mortgage documents, loan agreements, land ownership documents, etc. In some embodiments, the set of documents may include two documents or more than two documents. These documents may be accessible through web pages or through downloadable file formats such as PDF, DOC, DOCX, etc. or may be stored on a computer's data storage. In some embodiments, the changes in the legal documents may include new objects, removed objects, different placement of objects, etc. In some embodiments, the proposed invention may be useful in identifying any different textual information, along with any occurrence of data sliding. For example, in FIG. 2C, it may be determined that text block 212 and text block 216 represent the same text block and text block 216 from first exemplary comparison image 200 and second exemplary comparison image 202, respectively. In some embodiments, by examining the differences (as shown in result image 230) in a result image may make it easier for a user to identify how any pertinent instructions or information has changed in an updated version of a legal document. This may be further useful in identifying changes in the terms and conditions of a legal document.

In some embodiments, this invention may be useful in conducting a reverse image search. In the process of reverse image searching, one or more template images may be selected to determine whether any other matching images exist for the templates. In some embodiments, the images may be located on the Internet. In some embodiments, images located through the reverse image search may appear to be closely similar to the template images to the human eye, but the use of the proposed invention may uncover differences between the images. In some embodiments, a result image may outline the new objects, removed objects, instances of data sliding, or other image manipulation. As an example, in a possible scenario, an image similar to FIG. 2A may be selected as a template image and a reverse image search may uncover an image similar to FIG. 2B. In some embodiments, the methodology of the reverse image search may determine the first exemplary comparison image 200 and second exemplary comparison image 202 to be exactly the same. However, as would be uncovered through the proposed invention, first exemplary comparison image 200 and second exemplary comparison image 202, while they are similar, are different in many ways such as with the place of the buttons and the text blocks content and locations.

Although the invention has been described with reference to the embodiments illustrated in the attached drawing figures, it is noted that equivalents may be employed, and substitutions made herein without departing from the scope of the invention. Having thus described various embodiments, what is claimed as new and desired to be protected by Letters Patent includes the following:

The invention claimed is:

1. One or more non-transitory computer-readable media storing computer-executable instructions that, when executed by one or more processors, perform a method of comparing images, the method comprising:
   receiving a first image to be compared and a second image to be compared;
   converting the first image to be compared and the second image to be compared to grayscale;
   identifying a first plurality of unmatched regions in the first image to be compared;
   identifying a second plurality of unmatched regions in the second image to be compared;
   identifying each first unmatched region in the first plurality of unmatched regions with a corresponding second unmatched region in the second plurality of unmatched regions to obtain a plurality of image differences;
   for each image difference in the plurality of image differences, calculating a corresponding logical match percentage;
   for each image difference in the plurality of image differences, determining whether the image difference is a significant image difference based on the corresponding logical match percentage to obtain one or more significant image differences;
   generating a comparison result image illustrating the one or more significant image differences; and
   generating an image match report including the comparison result image illustrating the one or more significant image differences.

2. The non-transitory computer-readable media of claim 1, the method further comprising:
   comparing image properties between the first image to be compared and the second image to be compared; and
   in response to identifying different image properties between the first image to be compared and the second image to be compared, adjusting the image properties of at least one of the first image to be compared and the second image to be compared.

3. The non-transitory computer-readable media of claim 1, wherein identifying each first unmatched region in the first plurality of unmatched regions with the corresponding second unmatched region in the second plurality of unmatched regions comprises:
   performing cluster analysis of the first plurality of unmatched regions and the second plurality of unmatched regions;
   assigning a first unmatched region of the first plurality of unmatched regions into a first cluster and a second unmatched region of the second plurality of unmatched regions into a second cluster; and
   comparing the first unmatched region to a plurality of candidate unmatched regions from the second plurality of unmatched regions based on cluster analysis results from the first cluster and the second cluster.

4. The non-transitory computer-readable media of claim 1, wherein identifying each first unmatched region in the first plurality of unmatched regions with the corresponding second unmatched region in the second plurality of unmatched regions comprises:
  identifying an instance of data sliding between the first unmatched region and the corresponding second unmatched region.

5. The non-transitory computer-readable media of claim 1, the method further comprising:
  identifying a novel object in the second image to be compared relative to the first image to be compared.

6. The non-transitory computer-readable media of claim 1, wherein identifying each first unmatched region in the first plurality of unmatched regions with the corresponding second unmatched region in the second plurality of unmatched regions comprises:
  performing a first blob detection on the first unmatched region;
  performing a second blob detection on the corresponding second unmatched region; and
  comparing one or more first blobs identified in the first blob detection with one or more blobs identified in the second blob detection.

7. The non-transitory computer-readable media of claim 6, wherein performing blob detection on the first unmatched region comprises:
  using a blob detection technique selected from a set consisting of: a Laplacian-of-Gaussian algorithm, a Difference-of-Gaussian algorithm, and a Determinant-of-Hessian algorithm.

8. A method of comparing images, comprising:
  receiving a first image to be compared and a second image to be compared;
  identifying a first plurality of unmatched regions in the first image to be compared;
  identifying a second plurality of unmatched regions in the second image to be compared;
  performing cluster analysis of the first plurality of unmatched regions and the second plurality of unmatched regions;
  identifying each first unmatched region in the first plurality of unmatched regions with a corresponding second unmatched region in the second plurality of unmatched regions to obtain a plurality of image differences;
  for each image difference in the plurality of image differences, calculating a corresponding logical match percentage,
  for each image difference in the plurality of image differences, determining whether the image difference is a significant image difference based on the corresponding logical match percentage to obtain one or more significant image differences;
  generating a comparison result image illustrating the one or more significant image differences; and
  generating an image match report including the comparison result image illustrating the one or more significant image differences.

9. The method of claim 8, wherein the corresponding logical match percentage is based at least in part on a Euclidean Distance Logic calculation for the first unmatched region and the corresponding second unmatched region.

10. The method of claim 9, wherein the corresponding logical match percentage is based in further part on a mode pixel value comparison between the first unmatched region and the corresponding second unmatched region.

11. The method of claim 8,
  wherein the image match report further includes a plurality of corresponding logical match percentages.

12. The method of claim 8, wherein each region in the first plurality of unmatched regions and the second plurality of unmatched regions corresponds to a region selected from a set consisting of: a text region, an icon region, and a shape region.

13. The method of claim 8, wherein each region in the first plurality of unmatched regions and the second plurality of unmatched regions corresponds to a layer selected from a set consisting of: a foreground layer and a background layer.

14. The method of claim 8, further comprising:
  converting the first image to be compared and the second image to be compared to grayscale.

15. A system for comparing images comprising:
  one or more processors; and
  at least one non-transitory memory storing computer executable instructions that, when executed by the one or more processors, perform a method of comparing the images, the method comprising:
    receiving a first image to be compared and a second image to be compared;
    identifying a first plurality of unmatched regions in the first image to be compared;
    identifying a second plurality of unmatched regions in the second image to be compared;
    identifying each first unmatched region in the first plurality of unmatched regions with a corresponding second unmatched region in the second plurality of unmatched regions to obtain a plurality of image differences;
    for each image difference in the plurality of image differences, calculating a corresponding logical match percentage;
    for each image difference in the plurality of image differences, determining whether the image difference is significant to identify one or more significant image differences;
    generating a comparison result image illustrating the one or more significant image differences; and
    generating an image match report including the comparison result image illustrating the one or more significant image differences.

16. The system of claim 15, wherein the method further comprises:
  identifying an instance of data sliding between the first unmatched region and the corresponding second unmatched region.

17. The system of claim 15, wherein the image match report includes a plurality of logical match percentages and a plurality of physical match percentages.

18. The system of claim 15, wherein identifying each first unmatched region in the first plurality of unmatched regions with the corresponding second unmatched region in the second plurality of unmatched regions comprises a using technique selected from a set consisting of: a Laplacian-of-Gaussian algorithm, a Difference-of-Gaussian algorithm, and a Determinant-of-Hessian algorithm.

19. The system of claim 15, wherein the image match report excludes at least one image difference determined not to be significant.

20. The system of claim 15, wherein the image match report includes screenshots illustrating particular instances of significant image differences.

* * * * *